United States Patent
Nomura et al.

(10) Patent No.: US 12,493,935 B2
(45) Date of Patent: Dec. 9, 2025

(54) EVALUATION METHOD, EVALUATING APPARATUS, AND STORAGE MEDIUM

(71) Applicant: CANON KABUSHIKI KAISHA, Tokyo (JP)

(72) Inventors: Naoki Nomura, Kanagawa (JP); Mitsuhiro Saito, Kanagawa (JP); Toru Matsumoto, Kanagawa (JP); Tamaki Negishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 462 days.

(21) Appl. No.: 17/978,423

(22) Filed: Nov. 1, 2022

(65) Prior Publication Data
US 2023/0135751 A1    May 4, 2023

(30) Foreign Application Priority Data
Nov. 4, 2021    (JP) .................................. 2021-180197

(51) Int. Cl.
*G06T 5/73*    (2024.01)
*G06T 7/11*    (2017.01)
*H04N 23/68*    (2023.01)

(52) U.S. Cl.
CPC .................. *G06T 5/73* (2024.01); *G06T 7/11* (2017.01); *H04N 23/682* (2023.01); *G06T 2207/20201* (2013.01)

(58) Field of Classification Search
CPC ... G06T 5/73; G06T 7/11; G06T 2207/20201; G06T 2207/30168; G06T 7/0002; H04N 23/682; H04N 23/6811; H04N 23/6812
See application file for complete search history.

(56) References Cited

U.S. PATENT DOCUMENTS

| | | | |
|---|---|---|---|
| 8,270,751 B2 * | 9/2012 | Steinberg | H04N 23/6811 348/208.99 |
| 8,878,943 B2 * | 11/2014 | Kusaka | G03B 43/00 348/188 |

(Continued)

FOREIGN PATENT DOCUMENTS

| | | |
|---|---|---|
| JP | 09073110 A | 3/1997 |
| JP | 11109430 A | 4/1999 |

(Continued)

OTHER PUBLICATIONS

The above foreign patent documents were cited in the May 8, 2025 Japanese Office Action, which is enclosed without an English Translation, that issued in Japanese Patent Application No. 2021-180197.

*Primary Examiner* — Gregory A Morse
*Assistant Examiner* — Renae A Bitor
(74) *Attorney, Agent, or Firm* — Cowan, Liebowitz & Latman, P.C.

(57) ABSTRACT

The present invention provides an evaluation method for more precisely determining the blur correction capability of an image capturing apparatus. The method for evaluating the blur correction effect of the image capturing apparatus comprises acquiring a first change amount for each image capture from a predetermined captured number of subject images that have been captured by an image capturing apparatus that has been vibrated; dividing the predetermined number of captured images into a plurality of segments, and calculating a second change amount for each segment by performing statistical processing on the first change amounts in each of the plurality of segments; determining the largest second change amount from among the second change amounts in each segment to serve as a third change amount;

(Continued)

and performing evaluation of the blur correction effect based on the third change amount.

7 Claims, 7 Drawing Sheets

(56) References Cited

U.S. PATENT DOCUMENTS

2018/0213155 A1* 7/2018 Takayanagi ........ H04N 23/6811
2020/0213482 A1* 7/2020 Kobayashi ............. H04N 5/145

FOREIGN PATENT DOCUMENTS

| | | | |
|---|---|---|---|
| JP | 2009294283 | A | 12/2009 |
| JP | 5909686 | B2 | 4/2016 |
| WO | 2013076965 | A | 5/2013 |
| WO | 2013114896 | A | 8/2013 |

* cited by examiner

EVALUATION METHOD, EVALUATING APPARATUS, AND STORAGE MEDIUM

BACKGROUND OF THE INVENTION

Field of the Invention

The present invention relates to an evaluation method for an image capturing apparatus, in particular, to a method for evaluating the blur correction effect of an image capturing apparatus, an evaluating apparatus, and a storage medium.

Description of Related Art

Japanese Patent No. 5909686 discloses a method of calculating an evaluation value for blur correction effect taking into consideration the effect of an out of focus offset amount as a method for evaluating the blur correction effect and blur correction capability of an image capturing apparatus. Note that the out of focus offset amount is the out of focus amount for captured images resulting from reasons other than camera shake, and is a numerical value that is inherent to measuring devices that are controlled by the optical capability, valid pixel number, image processing, and the like of the image capturing apparatus.

Japanese Patent No. 5909686 discloses a method for evaluating camera shake correction results by observing the degree of deterioration of images that have been captured while vibrating the image capturing apparatus. In this context, generally, in the case in which the camera shake correction effects are evaluated by using a vibration apparatus, vibration is applied by using a vibration apparatus that has a blur waveform specified by a standard, and predetermined capabilities, and comparison is made after removing the out of focus offset amounts for each of a state in which the camera shake correction function is OFF and a state in which the camera shake correction function is ON. The number of images captured that is necessary in order to evaluate the camera shake correction effect is 200 images or more. The blur correction capability evaluation is performed based on the average value for the blur amount of the images that have been captured using the image capturing apparatus.

However, there are cases in which the blur amount is not fixed from the time when the image capturing of the captured images begins until the time when this is completed. For example, there are cases in which the blur is large during the initial stage of image capturing, cases in which the blur is large during the latter stage of image capturing, such as when the image capturing number has approached 200 images, and the like. In cases such as these in which a deviation in the blur amount occurs with the passage of time, the blur correction capability cannot be adequately evaluated using only the average value for the entirety of the captured images.

SUMMARY OF THE INVENTION

The invention of the present application has taken the above situation into consideration, and provides an evaluation method that more precisely determines the blur correction capability of an image capturing apparatus.

One embodiment of the present invention is a method for evaluating the blur correction effect of an image capturing apparatus, the method comprising: acquiring a first change amount for each image capture from a predetermined captured number of subject images that have been captured by an image capturing apparatus that has been vibrated; dividing the predetermined number of captured images into a plurality of segments, and calculating a second change amount for each segment by performing statistical processing on the first change amounts in each of the plurality of segments; determining the largest second change amount from among the second change amounts in each segment to serve as a third change amount; and performing evaluation of the blur correction effect based on the third change amount.

Further features of the present invention will become apparent from the following description of exemplary embodiments (with reference to the attached drawings).

DETAILED DESCRIPTION OF THE INVENTION

Below, embodiments for the present invention will be explained in reference to the drawings and the like. However, the following embodiments do not limit the inventions according to the claims, and it is not the case that all of the characteristics that are explained in the following embodiments are essential to the present invention.

Figure 1:
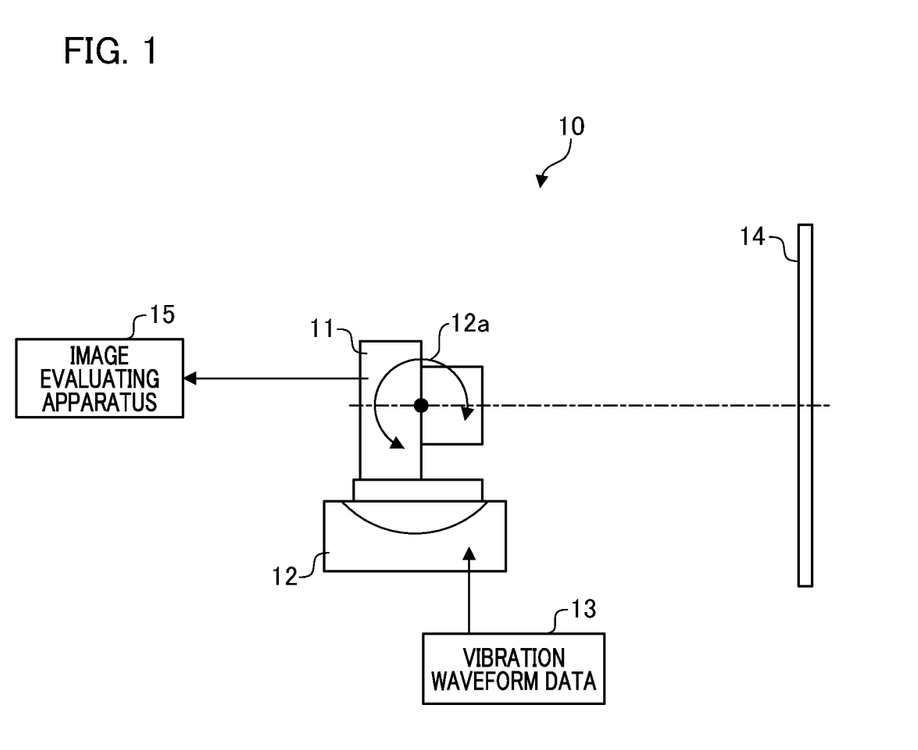
FIG. 1 is a schematic diagram showing an example of a configuration of an evaluation system in a First Embodiment.

FIG. 1 is a schematic diagram showing an example of a configuration of an evaluation system 10 according to the present embodiment. The evaluation system 10 is a system that measures blur correction effect for an image capturing apparatus 11. The image capturing apparatus 11, which is the measured device, is fixed to a vibrating base 12. The vibrating base 12 mechanically generates vibrations that simulate camera shake caused by a human based on vibration waveform data 13 that is input therein, and vibrates the image capturing apparatus 11. The vibrating base 12 performs vibration in the pitch direction (around the axis the of the perpendicular direction of the paper in FIG. 1) that is shown by the arrow 12a, as well as vibration in the yaw direction (around the axis of the vertical direction of the paper in FIG. 1). In addition, control for switching between the vibrating state and the rest state, and the like are also possible for the vibrating base 12.

The image capturing apparatus 11 that has been fixed to the vibrating base 12 captures images with a chart 14 that has been disposed to face the image capturing apparatus 11 serving as a subject. As one example, the chart 14 includes a plurality of white and black band regions having a fixed width in the horizontal and vertical directions, and a natural image portion in color.

The image of the chart that has been captured by the image capturing apparatus 11 during vibration is input into an image evaluating apparatus 15. The image evaluating apparatus 15 is, for example, a computer that executes image analysis software. The image evaluating apparatus 15 detects contrast in the image of the chart that has been captured by the image capturing apparatus 11, and measures deterioration in the image due to vibration.

Figure 2:
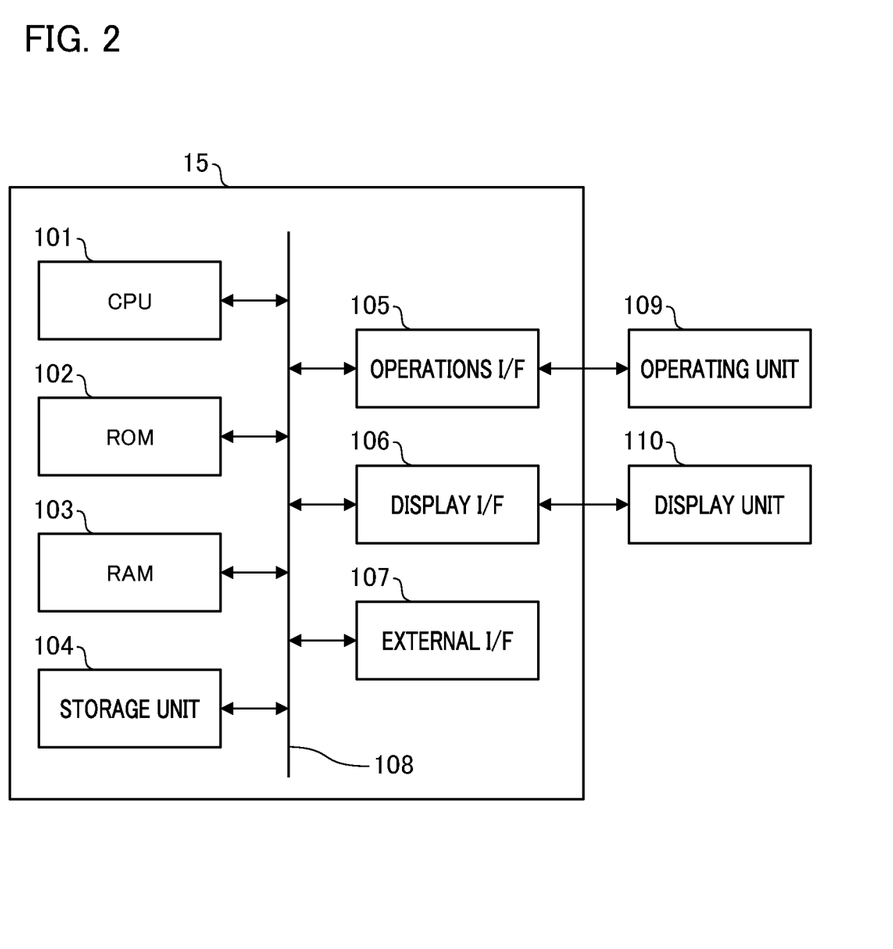
FIG. 2 is a diagram showing an example of a hardware configuration for an image evaluating apparatus.

FIG. 2 is a diagram showing an example of a hardware configuration for the image evaluating apparatus 15. The image evaluating apparatus 15 has a CPU 101, a ROM 102, a RAM 103, a storage unit 104, an operations I/F 105, a display I/F 106, and an external I/F 107. Each of the elements of the image evaluating apparatus 15 are connected to each other via a system bus 108. Note that CPU is an abbreviation of "Central Processing Unit", ROM is an abbreviation of "Read Only Memory", and RAM is an abbreviation of "Random Access Memory".

The CPU 101 activates an OS ("Operating System") by using a boot program that is saved on the ROM 102. The CPU 101 executes each type of processing to be described below by executing an image analysis software program that is saved on the storage unit 104 on the OS. The RAM 103 is used as a temporary region such as the main memory of the CPU 101, a work area, or the like. In the present embodiment, the CPU 101 functions as an acquisition unit that acquires a blur amount (a first change amount), a calculation unit that calculates a blur amount (a second change amount) using statistical processing, a determining unit that determines a determination value (a third change amount), and an evaluating unit that performs evaluation of blur correction effect.

The operations I/F 105 is an interface that connects the CPU 101 and an operating unit 109, and transmits the information that has been input from the operating unit 109 to the CPU 101. The operating unit 109 is a device that receives operator inputs to the image evaluating apparatus 15, and is configured by, for example, a keyboard and a pointing device, or the like.

The display I/F 106 is an interface that connects the CPU 101 and a display unit 110, and outputs the image data to be displayed to the display unit 110. The display unit 110 is a device that outputs operation screens for the image evaluating apparatus 15, and is configured by a display apparatus such as, for example, a liquid crystal display, or the like.

The external I/F 107 is an interface for acquiring image data and each type of information from the image capturing apparatus 11, which is the measured device. The external I/F 107 may also be configured to acquire information by wired or wireless communications, and may also be configured to load information via a detachable storage medium.

Figure 3:
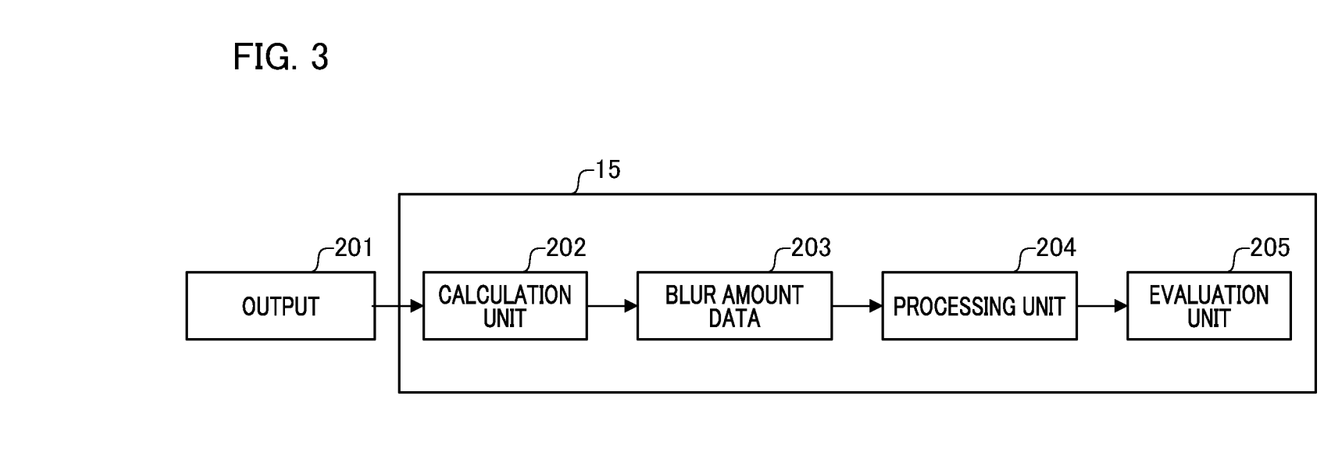
FIG. 3 is a block line diagram showing the operations of an image evaluating apparatus in a prior art example.

The operations of an image evaluating apparatus 15 in a prior art example will be explained using FIG. 3. FIG. 3 is a block line diagram showing the operations of an image evaluating apparatus 15 in a prior art example. Output 201 is subject image data from the time of vibration in the case in which the vibrating base 12 is in a vibrating state that has been captured by an image capturing apparatus 11 based on image capturing conditions that were determined using a plurality of exposure times or brightness. The output 201 is processed by a calculation unit 202 in FIG. 3.

The calculation unit 202 calculates the first change amount based on the output 201. Note that the first change amount that is calculated in this context is explained as the blur amount in order to simplify the following explanation. In this manner, in the present embodiment, the blur amount is one example of a first change amount. Blur amount data 203, which is calculated by the calculation unit 202, is calculated according to the output number of the output 201.

As an example, if the output 201 of the subject images that have been captured is 200 images, 200 pieces of data also exist for the blur data 203 that is output.

The processing unit 204 executes statistical processing on the blur amount data 203. In the present embodiment, the processing unit 204 executes statistical processing such as averaging or the like on the blur data amount 203. After this, the evaluation unit 205 performs a determination with respect to whether or not the image capturing apparatus 11 satisfies the blur capturing capability based on the data after the statistical processing.

In this context, the drawbacks of conventional methods for evaluating blur correction capability will be explained using FIG. 4 and FIG. 5. There are cases in which the camera shake correction capability does not function stably due to the parts that configure the blur correction mechanism that is built into the image capturing apparatus 11, and the control method of the blur correction mechanism. As one example, there are cases that are caused by a characteristic of the inertial sensor such as a gyro sensor or the like that is built into the blur correction mechanism in which the output of the DC components fluctuate, or so-called drift characteristics.

Figure 4A:
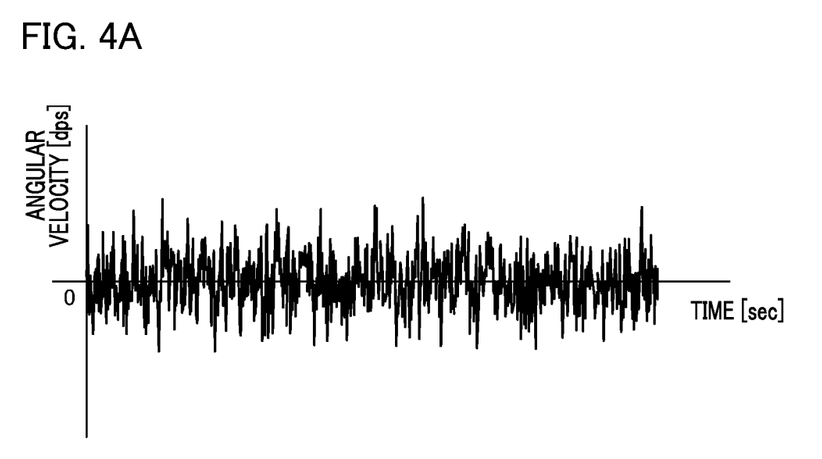
FIGS. 4A and 4B are graphs showing an output waveform from a gyro sensor when it is at rest.
Figure 4B:
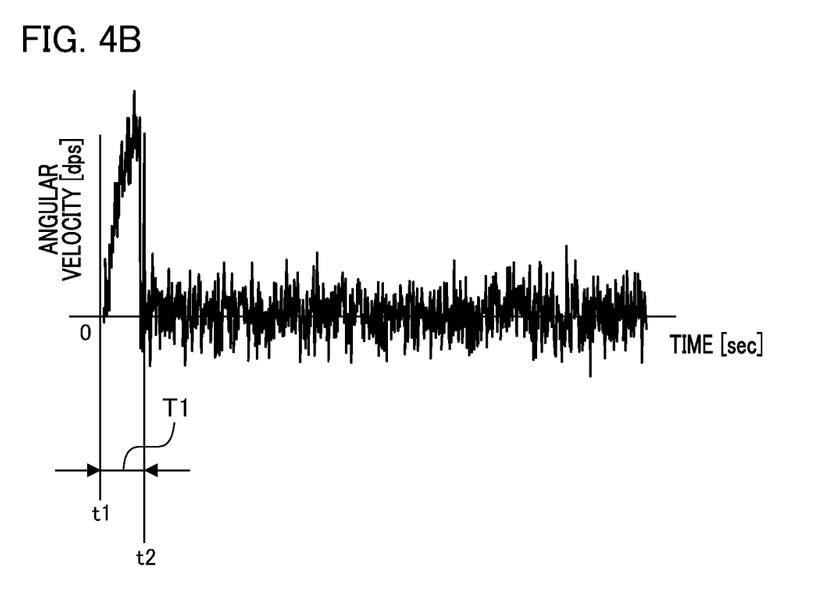

FIG. 4A, and FIG. 4B are graphs showing output waveforms from the gyro sensor when at rest. FIG. 4A shows the capability of a gyro sensor with extremely small drift characteristics. As is shown in FIG. 4A, in a gyro sensor that has extremely small drift characteristics, the output waveform from the gyro sensor when at rest is a waveform that has few fluctuations with the passage of time. The gyro sensor in FIG. 4A detects mechanical vibrations, the shaking of a person's hands, or the like as an input signal, and outputs this information. The blur correction mechanism that is built into the image capturing apparatus 11 is driven based on output from the gyro sensor, and performs operations to control blurring.

FIG. 4B shows the capability of a gyro sensor that has comparatively large drift characteristics. In FIG. 4B, the timing t1 is the timing during which a power source has been applied in order to activate the gyro sensor. The timing t2 shows the timing after a fixed time period has passed from the timing t1. The time period T1 shows the range from the timing t1 to the timing t2.

It is understood that even if the gyro sensor in FIG. 4B is in a state of rest, the output fluctuates greatly during the segment for the fixed time period T1 during which the power source was applied. Output information for a state in which the drift characteristics of the gyro sensor in FIG. 4B have been superimposed contains information other than the actual input. If the blur correction mechanism performs correction based on mistaken information such as this, an image with a large blur amount will be generated.

Figure 5:
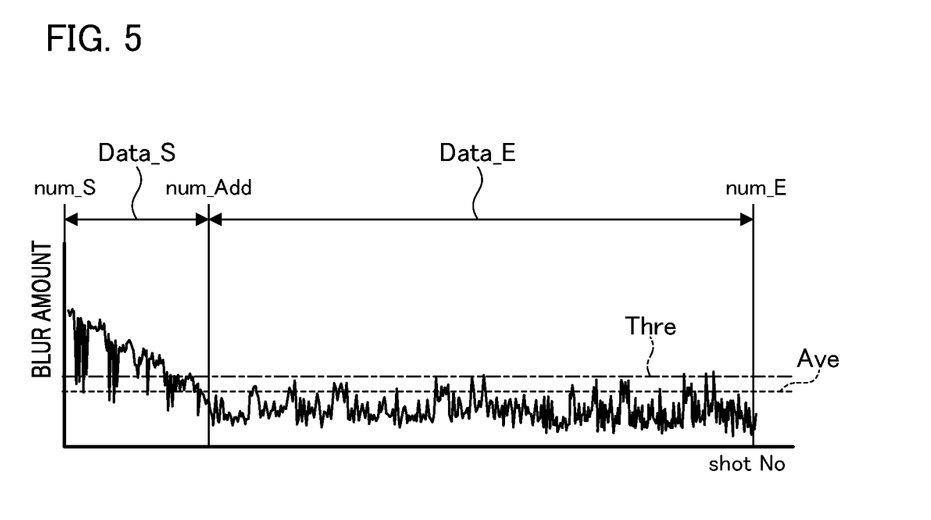
FIG. 5 is a graph explaining a method for evaluating blur correction effect in a prior art example.

FIG. 5 is a graph explaining a method for evaluating blur correction effect in a prior art example. Specifically, in FIG. 5, the results are shown for a case in which blur correction capability was performed and blur data was obtained by using the gyro sensor with a large drift characteristic that was shown in FIG. 4B. The evaluation of blur correction effect in prior art examples was performed by the calculation unit 202 in FIG. 3 calculating a blur amount based on subject image information that has been obtained by the measurement system in FIG. 1 using the gyro sensor in FIG. 4B. Note that there is only one set of exposure conditions. In the graph in FIG. 5, the vertical axis shows the blur amount of the subject image. The horizontal axis is the image capturing number, and shows the blur amount for each captured image in the order in which they were captured.

The blur amount for an image capturing number num_S that is shown in FIG. 5 shows the blur amount directly after image capturing began. In addition, the blur amount for an image capturing number num_Add shows the blur amount for the image capturing time point after a fixed time period has passed from the image capturing time point of the image capturing number num_S. The blur amount for an image capturing number num_E shows the blur amount from the time at which image capturing was completed. The blur amount for a segment Data_S is the blur amount for the divided segments from the image capturing number num_S until the image capturing number num_Add. The blur amount for a segment Data_E is the blur amount for the divided segments from the image capturing number num_Add until the image capturing number num_E. Note that the divided segments refer to the segments from a specific image capturing number until a specific image capturing number that comes after this.

In the example that is shown in FIG. 5, the segment Data_E has no large fluctuations in the blur amount, and is stable. In contrast, it is understood that there are large fluctuations in the blur amount in the segment Data_S. These are caused by the characteristics of the gyro sensor that was shown in FIG. 4B. Next, conventional evaluation of blur correction capability will be explained in further detail.

In FIG. 5, a determination threshold Thre for the evaluation of the blur correction capability is shown using a dashed line. In addition, an average value Ave that has been acquired by performing averaging processing on the entirety of the blur amount data is shown using a broken line. In conventional methods for evaluating blur correction capability, if the above explained average value Ave falls below the determination threshold Thre, it is determined that the blur correction capability criteria are satisfied. That is, in the case in which only the results of comparing the determination threshold Thre and the average value Ave are used, as a result, even with a blur amount result such as that in FIG. 5, the blur correction capability will satisfy the evaluation criteria. The reason for this is that even if there is a blur amount specification such as the segment Data_S, for which the blur amount greatly exceeds the evaluation criteria, this tendency is hidden by calculating the average value for the entirety of the blur amounts.

However, according to such conventional methods for evaluating blur correction capability, the photographer is only able to experience blur correction that matches this evaluation after a fixed amount of time has passed. That is, conventional methods for evaluating blur correction capability present the problem of not being able to perform evaluations that take into account the stability of the blur correction.

The present invention presents an evaluation method that more precisely determines the blur correction capability of an image capturing apparatus by performing evaluations taking into consideration the stability of the blur correction capability.

Figure 6:
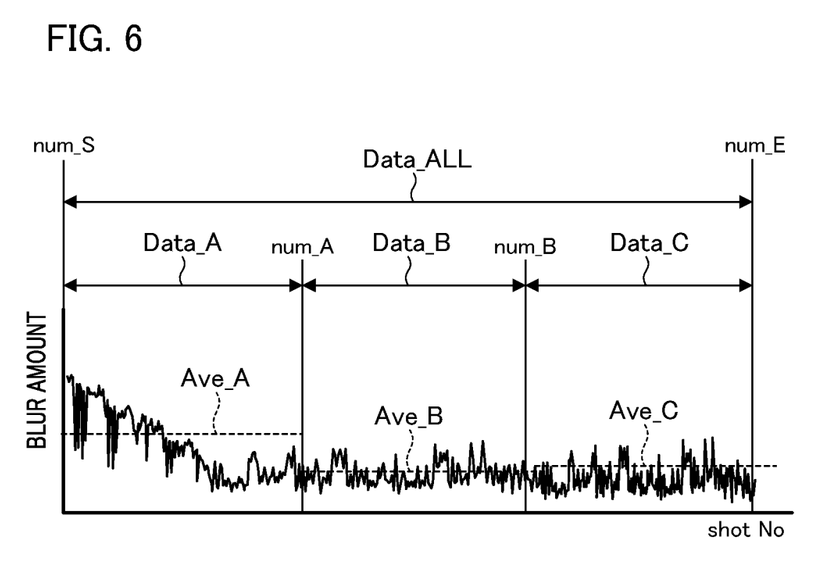
FIG. 6 is a graph explaining a method for evaluating blur correction effect in the present embodiment.

In the present embodiment, a method for evaluating blur correction capability will be explained. FIG. 6 is a graph explaining a method for evaluating blur correction effect in the present embodiment. Note that FIG. 6 uses FIG. 5 as a base, and therefore, by disclosing overlapping sections in the same manner, certain explanations have been omitted.

A segment Data_ALL, which is shown in FIG. 6, shows the data length for all of the blur amount data from the image capturing number num_S until the image capturing number num_E. In FIG. 6, a segment Data_A, a segment Data_B, and a segment Data_C define the data lengths for each segment in the case in which the segment Data_ALL, which is for the entire blur amount, has been divided into three segments.

The segment Data_A shows the segment from the image capturing number num_S until the image capturing number num_A. The segment Data_B shows the segment from the image capturing number num_A until the image capturing number num_B. The segment Data_C is the segment from the image capturing number num_B to the image capturing number num_E. In the present embodiment, the average values for the blur amount are each calculated from the above three segments, and these are used as the evaluation values. In this manner, in the present embodiment, the average value for the blur amount (evaluation value) in a predetermined range is one example of a second change amount. In this context, as in the example of the present embodiment, the second change amount is a blur amount which has been segmented using a predetermined number of images and has been statistically processed (averaged). More specifically, the average value for the blur amount in a predetermined range is a value in which the sum of the blur amounts in a predetermined range has been divided by the number of captured images in a predetermined range. In addition, it is preferable for the accurate capability of blur evaluation that the number of captured images is 200 images or more.

In FIG. 6, the average value Ave_A shows the average value for the blur amount in the segment Data_A. The average value Ave_B shows the average value for the blur amount in the segment Data_B. The average value Ave_C shows the average value for the blur amount in the segment Data_C. When the relationship between the average values for the blur amounts in each segment above is shown, the results such as the following formula (1) are obtained:

$$Ave\_A > Ave\_B \approx Ave\_C \tag{1}$$

The reason that results such as the formula (1) are obtained is because in the case in which a gyro sensor such as the one shown in the previously described FIG. 4B is used, blur correction is performed based on information in which the drift from the time of activation is incorrect. Therefore, the average value Ave_A becomes large in comparison to the average value for another range (the average value Ave_B and the average value Ave_C). In the segments for which the average value Ave_B and the average value Ave_C have been calculated, the output from the gyro sensor is also stable and without fluctuations, and therefore, as a result there are no large differences.

From these results, because the average value Ave_A becomes the largest value, the segment Data_A, which is the divided segment for which the average value Ave_A has been calculated, is determined as the evaluation segment that will become the criteria for the blur evaluation. In addition, the average value Ave_A for the blur amount in the evaluation segment is made the determination value that is used in the final evaluation, and evaluation of the blur correction capability is executed. In this manner, in the present embodiment, the average value Ave_A for the blur amount in the evaluation segment is one example of a third change amount (determination value). The third change amount is the largest second change amount from among the second change amounts in each segment. In this manner, in the present embodiment, the segment for which it is determined that the value related to the blur amount is the largest from among the plurality of divided segments is selected to serve as the evaluation segment, and a value in which statistical processing such as averaging or the like has been performed on the blur amount in the evaluation segment is calculated to serve as the determination value. The evaluation of blur correction capability is executed by using this determination value.

Figure 7:
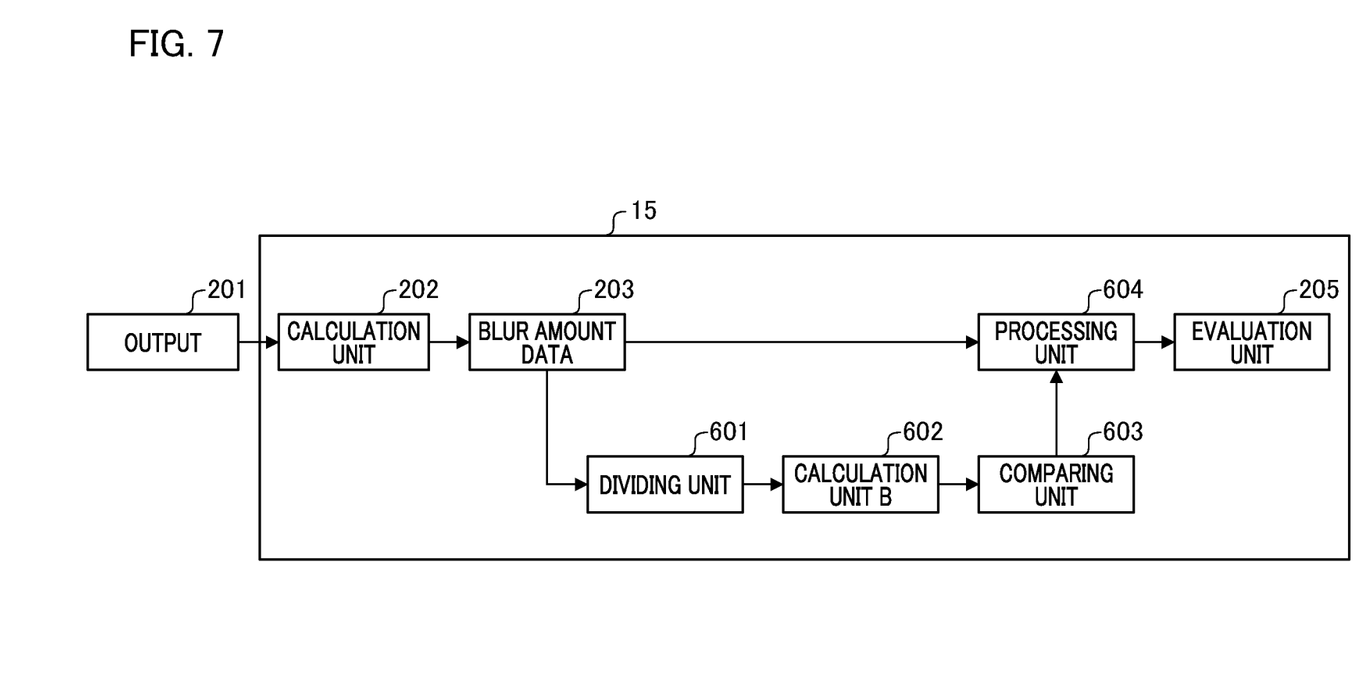
FIG. 7 is a block line diagram showing operations of an image evaluating apparatus in the present embodiment.

FIG. 7 is a block line diagram showing operations of the image evaluating apparatus 15 in the present embodiment. The operations of the image evaluating apparatus 15 in the present embodiment will be explained using FIG. 7. Note that FIG. 7 uses FIG. 3 as a base, and therefore, by disclosing overlapping sections in the same manner, appropriate explanations have been omitted. In FIG. 7 as well, as was described above, the blur amount data 203 is obtained by the output 201, which is subject image data that has been captured at the time of vibration, being processed by the calculation unit 202.

A dividing unit 601 divides the blur amount data 203 for the number of captured images that has been calculated by the calculation unit 202 into a plurality of divided segments.

A calculation unit B 602 performs statistical processing such as averaging processing or the like on each of the plurality of segments that have been divided by the dividing unit 601, and calculates the evaluation value for the blur correction capability.

A comparing unit 603 selects the evaluation value with the largest value from among the evaluation values for the blur correction capability that have been calculated by the calculation unit B 602. The comparing unit 603 transmits the divided segment for which the largest evaluation value has been calculated to a processing unit 604 to serve as the evaluation segment.

The processing unit 604 uses the information for the evaluation segment that has been obtained by the comparing unit 603, and calculates the blur amount average value, which is the determination value, for the data that corresponds to the evaluation segment from among the data from the blur amount data 203.

The evaluation unit 205 performs a determination as to whether or not the blur correction capability is satisfied based on the blur average value that has been obtained by the processing unit 604. The determination as to whether or not the blur correction capability is satisfied is performed, as will be explained below, using whether or not it exceeds the determination threshold Thre. That is, in the case in which the determination value is equal to or greater than the determination threshold value Thre, it will be determined that the blur correction capability is not satisfied. In contrast, in the case in which the determination value is less than the determination threshold Thre, it will be determined that the blur correction capability is satisfied.

Note that in the case in which the division of the segments is not performed, the processing unit 604 will directly transmit the blur amount data 203 that has been obtained by the calculation unit 202 without using the dividing unit 601.

Preferred embodiments of the present invention have been explained above. However, the present invention is not limited by these embodiments, and various modifications or alterations can be made within the scope of the summary thereof.

In the present embodiment, the determination value has been expressed as the blur amount average value in order to simplify the explanation. However, the determination value is not limited to the blur amount average value. For example, the variance value for the blur amount may also be the determination value. In the case in which the variance value is used as well, a predetermined variance value is made the determination threshold, and in the case in which the value is larger than this determination threshold, it is determined that the blur correction capability is not satisfied. In contrast, in the case in which the value is less than this determination threshold, it is determined that the blur correction capability is satisfied.

In the same manner, in the present embodiment, the statistical processing for the case in which the evaluation value is calculated is the performance of averaging processing to obtain an average value for each divided segment. However, the present invention is not limited thereto. For example, the same results may also be obtained even if processing to obtain variance values for each divided segment is performed.

In addition, in the calculation of the evaluation value in the present embodiment, the divided segments have been provided for three segments. However, the number of segments is not limited to three. That is, in the case in which the predetermined number of captured images (in the present embodiment, 200 images or more) is divided into a plurality of segments, the present embodiment has three segments. Specifically, as the plurality of segments, the present embodiment has a divided segment that includes the initial captured image from the time when image capturing began (the first divided segment), a divided segment that continues from this segment with the passage of time (the second divided segment), and a divided segment including the final image from when image capturing was completed (the third divided segment). However, the second divided segment is not essential, and there may also be a total of two divided segments. In addition, it may also be made so that there are four or more divided segments in total by dividing the second divided segment into a plurality of segments.

When the segments are divided as in the present embodiment, it is preferable that the captured images that are the data amount for the divided segments is around 70 images. This is because when the segments are divided, in the case in which the data amount is too small, it is not possible to remove the effects of singular points in the obtained data, and as a result, there is a possibility that the degree of precision for the evaluation of the blur correction capability will be lowered. Therefore, it is necessary to divide the segments such that there are around 70 captured images, which are the data amount. As an example, in the case in which 500 images have been acquired as the total data, the number of divided segments will be made approximately 7. In the case in which 700 images have been acquired as the total data, the number of divided segments will be made 10, and so forth is imagined.

According to the method of the present embodiment, evaluation with a higher precision than in the prior art is possible without the average being buried by unstable results even if the capability is unstable such as when there is a trend toward large fluctuations in the blur amounts in the initial stages due to the parts that configure the blur correction, the control, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-180197, filed Nov. 4 2021, which is hereby incorporated by reference herein in its entirety.

What is claimed is:

1. An evaluation method for blur correction effect of an image capturing apparatus, the method comprising:
    acquiring a first blur amount for each image capture from a predetermined captured number of subject images that have been captured by an image capturing apparatus that has been vibrated;
    dividing the predetermined number of captured images into a plurality of segments based on an order of image capturing so that each of the plurality of segments includes a plurality of captured images, and calculating a second blur amount for each segment by performing statistical processing on the first blur amounts in each of the plurality of segments;
    determining the largest second blur amount from among the second blur amounts in each segment to serve as a third blur amount; and
    performing evaluation of the blur correction effect based on the third blur amount,
    in a case in which the third blur amount is at or above a predetermined threshold, it is determined that the blur correction capability is not satisfied, and in a case in which the third blur amount is less than the predetermined threshold, it is determined that the blur correction capability is satisfied.

2. The evaluation method according to claim 1, wherein the predetermined number of captured images is 200 images or more.

3. The evaluation method according to claim 1 wherein, the statistical processing is processing for obtaining an average value.

4. The evaluation method according to claim 1, wherein the statistical processing is processing for obtaining a variance value.

5. The evaluation method according to claim 1 wherein, in a case in which the predetermined number of captured images is divided into a plurality of segments, the plurality of segments includes a first divided segment that includes the initial captured image from the time when image capturing began, a second divided segment that continues from the first divided segment, and a third divided segment that includes the final captured image from the time when image capturing was completed.

6. An evaluating apparatus for blur correction effect of an image capturing apparatus comprising:
    a memory storing instructions; and
    a processor executing the instructions causing the evaluating apparatus to:
    acquire a first blur amount for each image capture from a predetermined captured number of subject images that have been captured by an image capturing apparatus that has been vibrated;
    divide the predetermined number of captured images into a plurality of segments based on an order of image capturing so that each of the plurality of segments includes a plurality of captured images, and calculate a second blur amount for each segment by performing statistical processing on the first blur amounts in each of the plurality of segments;
    determine the largest second blur amount from among the second blur amounts in each segment to serve as a third blur amount; and
    perform evaluation of the blur correction effect based on the third blur amount,
    in a case in which the third blur amount is at or above a predetermined threshold, it is determined that the blur correction capability is not satisfied, and in a case in which the third blur amount is less than the predetermined threshold, it is determined that the blur correction capability is satisfied.

7. A non-transitory storage medium on which is stored a computer program related to a method for evaluating blur correction effect of an image capturing apparatus, the method comprising:
    acquiring a first change amount for each image capture from a predetermined captured number of subject images that have been captured by an image capturing apparatus that has been vibrated;
    dividing the predetermined number of captured images into a plurality of segments based on an order of image capturing so that each of the plurality of segments includes a plurality of captured images, and calculating a second blur amount for each segment by performing statistical processing on the first blur amounts in each of the plurality of segments;
    determining the largest second blur amount from among the second blur amounts in each segment to serve as a third blur amount; and
    performing evaluation of the blur correction effect based on the third blur amount,
    in a case in which the third blur amount is at or above a predetermined threshold, it is determined that the blur correction capability is not satisfied, and in a case in which the third blur amount is less than the predetermined threshold, it is determined that the blur correction capability is satisfied.

* * * * *